(12) United States Patent
Yasutake et al.

(10) Patent No.: US 7,770,474 B2
(45) Date of Patent: Aug. 10, 2010

(54) SAMPLE OPERATION APPARATUS

(75) Inventors: Masatoshi Yasutake, Chiba (JP); Takeshi Umemoto, Chiba (JP)

(73) Assignee: SII NanoTechnology Inc., Chiba (JP)

( * ) Notice: Subject to any disclaimer, the term of this patent is extended or adjusted under 35 U.S.C. 154(b) by 492 days.

(21) Appl. No.: 11/928,303

(22) Filed: Oct. 30, 2007

(65) Prior Publication Data
US 2008/0105043 A1    May 8, 2008

(51) Int. Cl.
*G01B 5/28* (2006.01)
(52) U.S. Cl. .......................... 73/863; 73/105
(58) Field of Classification Search ................. None
See application file for complete search history.

(56) References Cited
U.S. PATENT DOCUMENTS
6,777,674 B2 * 8/2004 Moore et al. ............. 250/307

OTHER PUBLICATIONS

Takekawa et al., "Development in AFM tweezers for performing manipulation of nanomatter", Denki Gakkai Ronbunshi, E. Trans. SM, vol. 125, No. 11, pp. 448-453 2005.

* cited by examiner

*Primary Examiner*—Robert R Raevis
(74) *Attorney, Agent, or Firm*—Brinks Hofer Gilson & Lione

(57) ABSTRACT

There is provided a sample operation apparatus in which, by a static electricity force acting between a probe and a sample, an accurate position is gripped without the sample being moved, and the sample can be operated by the probe for an observation, a grip, a release, or the like. There is made such that an AC electric source applying an AC voltage to an observation probe having in its tip and a bias electric source applying a DC voltage are connected, a bias electric source applying the DC voltage a grip probe adjoining the observation probe is possessed, there is relatively moved by a scanner in a plane (XY) direction in regard to a substrate fixed to a sample base, a vibration of the observation probe, which occurs by a static electricity between the tip and the substrate or the sample on the substrate, or the like, is detected by a lock-in amplifier through a displacement detection means, there is applied to the observation probe by the bias electric source such that the vibration becomes small by a feedback circuit, and there is applied also to the grip probe similarly by the bias electric source.

6 Claims, 2 Drawing Sheets

SAMPLE OPERATION APPARATUS

RELATED APPLICATIONS

This application claims priority under 35 U.S.C. § 119 to Japanese Patent Application No. JP2006-295212 filed Oct. 31, 2006, the entire content of which is hereby incorporated by reference.

BACKGROUND OF THE INVENTION

1. Field of the Invention

The present invention relates to a sample operation apparatus in which a sample (specified site) on a substrate is operated by scanning a sample surface to thereby obtain a surface shape or a physical property information of the substrate or the sample.

2. Description of the Related Art

As an apparatus for performing an observation of the surface shape of the sample, and a measurement of the physical property information or the like by measuring the sample, such as electronic material and organic material, in a mice region, there is known a scanning probe microscope such as atomic force microscope (AFM) or scanning tunnel microscope. Further, from the fact that this scanning probe microscope is accurate also as a three-dimensional positioning mechanism, various proposals are made also as a working apparatus of a micro portion.

As an application to an operation (manipulation) of the sample, in which the scanning probe microscope is used, there is contrived one called an AFM tweezers in which the sample is inserted between two probes and the sample is gripped/released.

As this AFM tweezers, in a cantilever user in the scanning probe microscope or the like, there is contrived 1) one in which two carbon nanotubes are attached as a tip onto silicon tip, 2) one in which a carbon nanotube is attached to a glass tube as the cantilever, additionally 3) one in which the two cantilevers are made from a silicon substrate by using MEMS (Micro Electro Mechanical Systems), or the like.

In the tweezers of 1) or 2), an opening/closing of the two carbon nanotubes is performed by applying a static electricity between two carbon nanotube tips and, in the tweezers of 3), there is known one in which an electrostatic actuator like comb teeth is constituted in order to grip by the two cantilevers, or one in which an electrostatic current is flowed to a root of the cantilever and a linear expansion of silicon by a heat generation is used in a drive by being enlarged. (For example, refer to Tetsuya Takekawa, Hajime Hashiguchi, Ei'ichi Tamiya, et al. "Development in AFM tweezers for performing manipulation of nanomatter" *Denki Gakkai Ronbunshi*, E. Trans. SM, Vol. 125, No. 11, 2005.)

Generally, the tweezers operates in a gravitational field, the sample is fixed onto a substrate by its own weight or other adhesion force and, in a case where a gripping force and a pulling-up force of the tweezers exceeds the own weight and the adhesion force, it is possible to grip the sample. Further, also as to a separation from the tweezers, if a grip of the tweezers is released, the sample separates by its own weight from the tweezers and drops to a substrate face.

However, if there becomes such a micro sample that a size of the sample is smaller than about 30 µm in diameter for instance, an effect by the own weight of the sample approximately balances with other adhesion force that the sample undergoes, and a motion such as the grip and the separation of the sample becomes complicated.

Since the AFM tweezers has a purpose of operating the grip and the separation of the sample whose diameter is fairly smaller than 30 µm, it follows that it undergoes large an influence of a force other than the gravity.

Especially, the influence of a static electricity force is large and, in the conventional AFM tweezers, by the static electricity force acting between the sample and a probe such as carbon nanotube tip, the sample moves on a substrate, so that there is an issue that the grip is not made well. For example, in a case of the sample, such as glass bead (whose diameter is several µm), on a glass substrate, the glass bead is normally electrified and, if the probe is approached in order to grip the glass bead by the AFM tweezers, the glass bead is adsorbed to the probe or repelled from the probe by the static electricity force between the probe and the glass bead and thus its position changes large, so that the operation such as the grip by the AFM tweezers or the separation is very difficult.

SUMMARY OF THE INVENTION

The present invention is one made in view of the circumstances like these, and its object is to make such that, by controlling the static electricity force between the probe and the substrate or the sample, the sample can be accurately position-observed without being scattered, and a predetermined sample can be certainly gripped or separated.

In order to solve the above problem, the present invention adopts the following means.

That is, the present invention is a sample operation apparatus operating a sample by a sample base mounting the sample or a substrate mounted with the sample, an observation probe having an electrical conductivity and having in its tip, which is provided opposite to the sample base, and a grip probe having the electrical conductivity, which is provided while adjoining the observation probe with a predetermined distance, and it is made a constitution comprising an AC electric source applying an AC voltage to the observation probe to thereby generate a vibration by a static electricity force between the observation probe and the sample or the substrate to which the sample is fixed, a displacement detection means detecting the vibration as a displacement of the observation probe, a scan means relatively moving the sample base and the observation probe or the grip probe in a direction parallel to a surface of the sample base, a second scan means relatively moving the same in a direction perpendicular to the same, and a bias electric source applying a DC voltage to the observation prove.

Additionally, there is made such that this bias electric source detects the vibration of the observation probe by the AC electric source by the displacement detection means, and applies such a DC voltage that this vibration by the AC electric source becomes small.

Further, there is made a constitution possessing a second bias electric source applying a DC voltage to the grip probe, and a delay circuit finding a timing at which this bias electric source applies it to the grip probe.

Here, the second bias electric source applies the voltage that the bias electric source applied, at the timing found by the delay circuit while scanning the observation probe and the grip probe parallel to the surface of the sample base by the scan means.

Incidentally, the respective constitutions mentioned above can be mutually combined so long as not deviating from a gist of the present invention.

In the sample operation apparatus of the present invention, by the fact that the electric potentials between the observation probe and the grip probe and between the substrate and the sample are made near zero volt, it is possible to reduce a movement and a scattering of the sample by the static electricity force at a shape measurement (sample observation) time of the substrate and the sample. Additionally, also when performing the operation of the grip, the separation or the like of the sample, it is possible to perform a certain operation of the grip, the separation or the like by the fact that the electric potentials between the sample and the observation probe as well as the grip probe are kept near zero volt.

DETAILED DESCRIPTION OF THE PREFERRED EMBODIMENT

Figure 1:
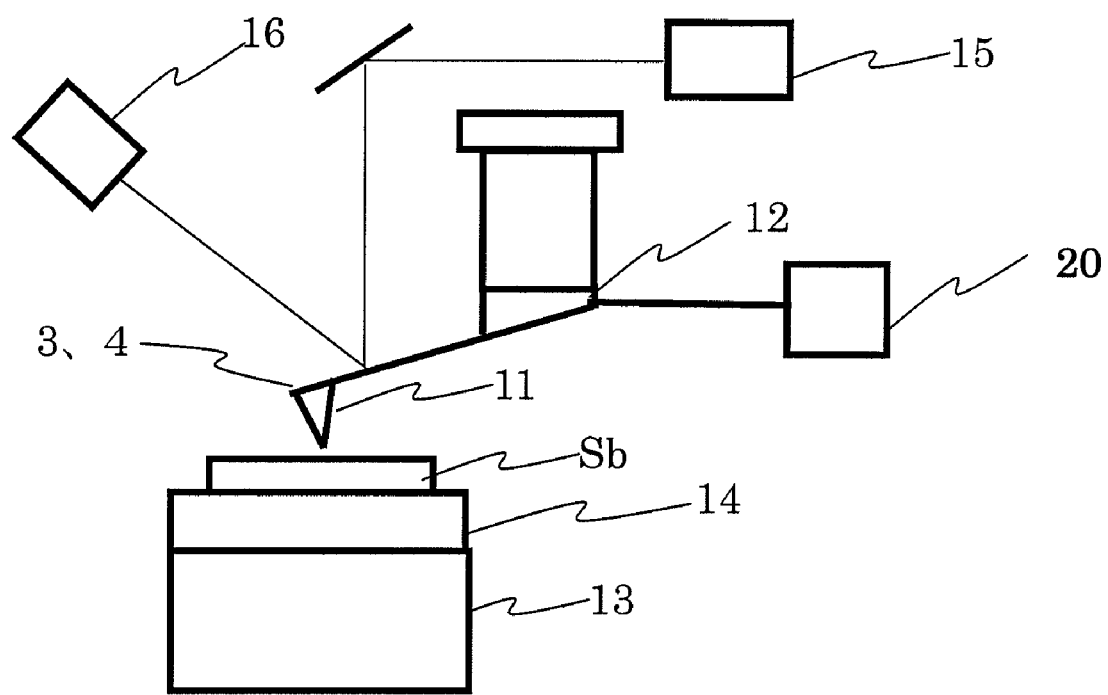
FIG. 1 is a schematic, constitutional diagram of a sample operation apparatus concerned with an embodiment of the present invention.
Figure 2:
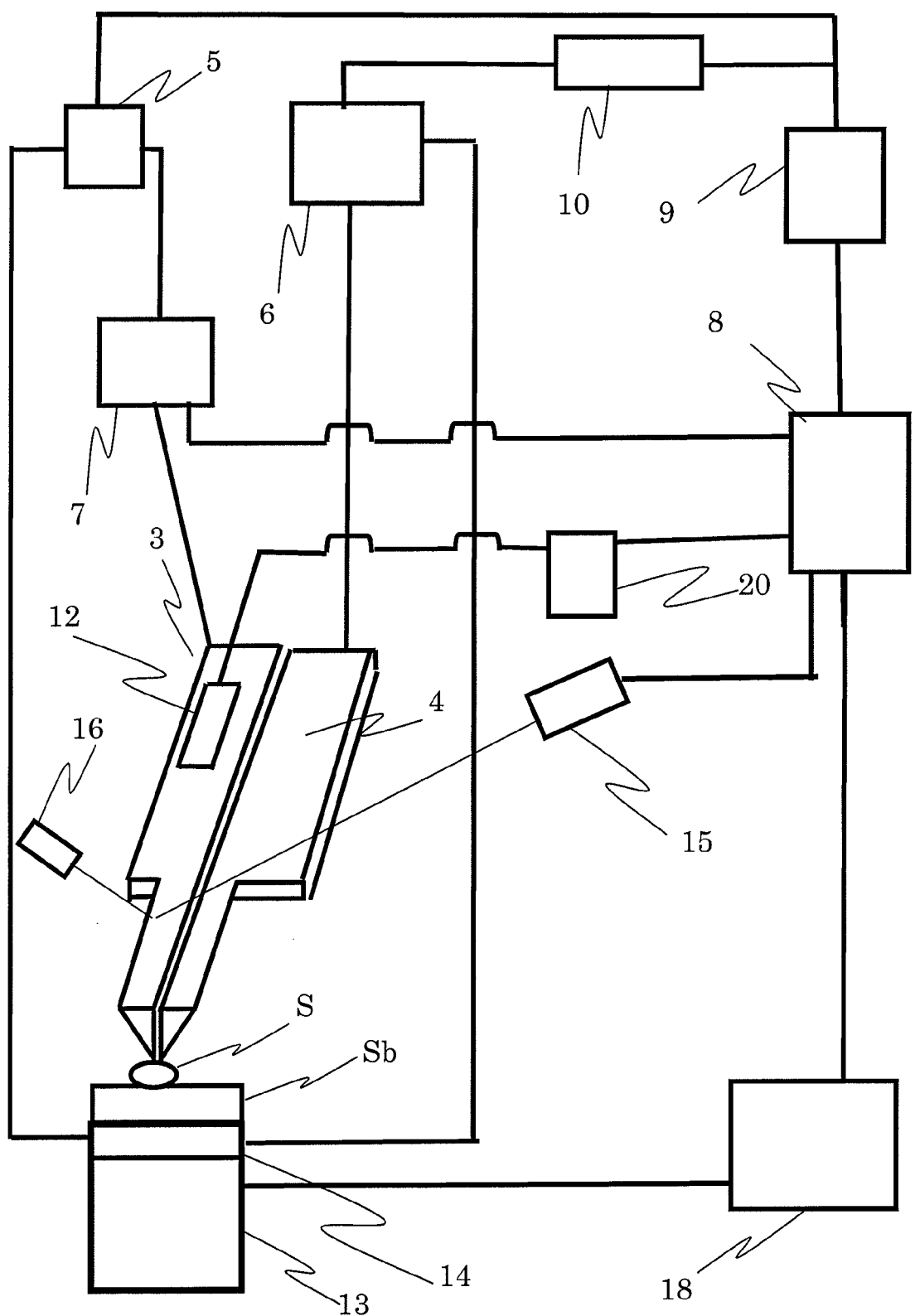
FIG. 2 is an enlarged schematic, constitutional block diagram in a probe vicinity of the sample operation apparatus concerned with the embodiment of the present invention.

Hereunder, a first embodiment of a sample operation apparatus by the present invention is explained by referring to FIG. 1 to FIG. 2.

A schematic constitution of the sample operation apparatus of the present invention is shown in FIG. 1. There are provided an electrically conductive observation probe 3 having in its tip 11 and observing a shape of a sample S on a substrate Sb, an electrically conductive grip probe 4 gripping the sample S together with the observation probe 3, and a piezoelectric body 12 for vibrating the observation probe 3. Further, the substrate Sb is mounted on a sample base 14, and the sample S becoming an object article to be operated is disposed on the substrate Sb.

In the present embodiment, the observation probe 3 and the grip probe 4 are set such that their resonance frequencies differ by changing lengths of the probes, and additionally the observation probe 3 and the grip probe 4 are electrically insulated.

Incidentally, in order to make the resonance frequency variable, there may be changed a width, a thickness or the like of the probe.

There exist the sample base 14 mounting the sample S disposed opposite to the observation probe 3 and the grip probe 4, an XY scanner as a scan means, which relatively moves the observation probe 3 or the grip probe 4 and the sample base 14 in an XY direction parallel to a sample face, and a Z scanner as a second scan means, which relatively moves it or them in a Z direction perpendicular to the sample face, and there are possessed an XYZ scanner 13 in which the XY scanner and the Z scanner are made one body type, and an XYZ one body type scanner controller 18 becoming a scan control means, which includes an XY scan system and a Z servo system, which are for controlling the XYZ scanner 13.

Incidentally, in the present embodiment, in order to be relatively moved in three-dimensional directions of XYZ, although there is used the XYZ scanner using a piezoelectric element provided in a sample base side, this may be provided in a probe side, or while being separated to the XY scanner, the Z scanner, or the like.

Additionally, there is possessed a displacement measurement means comprising a laser light source 16 generating a laser light, which is called an optical lever system, and a photodetector 15, such as photodiode, which is bisected or divided into four and detects a displacement of the observation probe 3 by detecting the laser light reflected by a back face of the observation probe 3.

Incidentally, not the optical lever system like the present embodiment, there may be used a system called a self detection type probe, which possesses a piezoelectric resistor in the observation probe 3 and finds a displacement of the observation probe as a displacement of this piezoelectric resistor.

Further, in FIG. 2, there is shown a block diagram showing an enlarged schematic constitution in a vicinity of the observation probe 3 or the grip probe 4 in the sample operation apparatus of the present embodiment.

Here, about a shape measurement and an electric potential measurement of the substrate Sb and the sample S, there are explained below.

First, the observation probe 3 is vibrated by controlling so as to become a resonance frequency of the observation probe 3 by a piezoelectric body vibrating electric source 20 and the piezoelectric body 12. And, by scanning the observation probe 3 and the grip probe 4 in the XY direction parallel to a substrate surface by the XYZ scanner 13, and controlling the Z direction scanner such that an amplitude damping rate of the resonance frequency of the observation probe 3 becomes constant while detecting the displacement of the observation probe 3 by the displacement measurement means, a distance between the tip 11 and the substrate surface or the sample surface becomes constant. At this time, by measuring a vibration resulting from the static electricity force between the tip 11 and the sample S or the substrate Sb by the displacement measurement means, the electric potential of the sample surface is measured. And, by applying a DC voltage to the observation probe 3 by a bias electric source 5, and controlling the bias electric source 5 for applying the DC voltage to the observation probe 3 such that the electric potential of the sample S or the substrate Sb becomes near 0 V, in other words, such that the vibration resulting from the static electricity force is made small (becomes almost null), there is made such that the static electricity force of the sample S and the observation probe including the tip 11 becomes small.

Incidentally, a scanning method when shape-measuring in the present embodiment is made so as to pass a predetermined position in order of from the observation probe to the grip probe, and a spacing of about 4 μm is provided between the observation probe 3 and the grip probe.

Further, there are possessed a bias electric source 6 for applying the DC voltage to the grip probe, and an AC electric source 7 for applying an AC voltage to the observation probe 3.

Here, about a method of measuring the above-mentioned electric potential between the observation probe and the sample or the substrate, there is detailedly explained below.

An AC voltage Va shown in Expression 1 is being applied by the AC electric source 7 between the observing probe 3 and the sample base 14.

$$Va = Vac \sin \omega t \quad \text{[Expression 1]}$$

Where, Vac is an amplitude of the AC voltage, and ω an angular frequency.

And, a static electricity energy W acting between the observation probe 3 and sample S or the substrate Sb is shown like Expression 2 below.

$$W = (1/2) C_1 V^2 \quad \text{[Expression 2]}$$

Where, C1 becomes an electrostatic capacity between the observation probe and the sample or the substrate, and V a voltage applied between the observation probe and the sample base.

Further, the voltage V can be shown like Expression 3 below.

$$V = (V_s + V_{ac} \sin \omega t) \quad \text{[Expression 3]}$$

Where, Vs becomes a surface electric potential of the sample or the substrate.

Accordingly, a static electricity force Fz of the Z direction acting between the observation probe and the sample or the substrate becomes $$Fz = \frac{1}{2} \frac{\partial C_1}{\partial Z}(V_s^2 + 2V_s V_{ac} \sin\omega t + V_{ac}^2 \sin^2\omega t)$$
$$= \frac{1}{2} \frac{\partial C_1}{\partial Z}\left(V_s^2 + \frac{V_{ac}^2}{2} + 2V_s V_{ac} \sin\omega t - V_{ac} \cos 2\omega t\right)$$

by substituting the Expression 3 into the Expression 2 and being partially differentiated in the Z direction.

It follows that this static electricity force Fz in the Z direction vibrates the observation probe at the angular frequency ω or 2ω. And, a displacement of this vibration is detected by a displacement detection means detecting a displacement of the observation probe, and each angular frequency component is measured by a lock-in amplifier 8.

Additionally, there is made such that, on the basis of the angular frequency ω measured in the lock-in amplifier 8, a voltage feedback circuit 9 is actuated such that the ω term in the Expression 1 becomes zero (0), and a feedback voltage φ(=−Vs) is applied to the DC bias electric source 5. That is, the voltage applied to the DC bias electric source 5 becomes a surface electric potential just below the tip 11 of the observation probe 3.

By this, the electric potential between the tip 11 of the observation probe 3 and the sample S or the substrate Sb becomes Vac²/2−Vac Cos 2ωt and, by setting the Vac to a low voltage, the static electricity force acting between the observation probe 3 and the sample S or the Substrate Sb becomes small, so that there becomes such that a movement of the sample can be reduced.

Further, at this point of time, the bias electric source 6 of the grip probe 4 fixes the electric potential of the substrate Sb, which is measured just before passing on the sample S, to an electric potential to be countervailed, by the observation probe 3.

Next, in a case of the grip probe 4, the spacing (4 μm in the present embodiment) between the observation probe 3 and the grip probe 4 is divided by a set scanning velocity in the X direction to thereby find, by a delay circuit 10, a timing (delay time) till the grip probe 4 arrives to a position of the sample S, through which the observation probe 3 passes, and, when the grip probe 4 passes just above the sample or the substrate while delaying by a certain time after the observation probe 3 passes just above the sample S, by the bias electric source 6 there is applied between the grip probe 4 and the sample base such that there becomes a voltage waveform similar to be applied by the observation probe 3 so as to countervail a surface electric potential between the tip and the sample or the substrate, i.e., becomes φ(t)=−Vs (t) (where, t is each time instant at which the observation probe passes through the sample).

By this, also the electric potential between the grip probe and the sample or the substrate becomes near zero (0) V, and also an electric potential difference becomes near zero (0) V, so that there can be reduced the fact that the sample is scattered by the grip probe.

Additionally, here by separating with the scanner in the Z direction more than a height of the convex part by a time when the grip probe passes the sample S, there becomes null the fact that the sample is caught by the grip probe and moved.

Further, also during a time in which the grip probe 4 passes above the sample S, the observation probe 3 continues to control the DC bias electric source 5 so as to become an electric potential countervailing the electric potential of the substrate Sb just below the observation probe 3.

By doing like this, i.e., by controlling such that the static electricity force of the probe and the substrate or the specified site of the sample can be made small at a scan time for measuring the shape of the substrate or the sample, a shape observation can be accurately performed without dispersing the sample, and it is possible to accurately grasp the position of the sample to be gripped.

Incidentally, in the present embodiment, although the bias voltage is individually applied by electrically insulating the observation probe 3 and the grip probe 4, simply the observation probe 3 and the grip probe 4 may be made always the same electric potential by electrically connecting the observation probe 3 and the grip probe 4 and applying the bias voltage to the observation probe 3 and the grip probe 4 from the bias electric source 5. In this case, the delay circuit 10 is not necessary.

Next, a case gripping the sample by using the observation probe and the grip probe is explained below.

After finishing a shape measurement of the substrate or the sample, a positional alignment is performed on the basis of its shape-measured information by using the XYZ scanner 13 such that the sample S becoming an operation object is placed just below the spacing between the observation probe 3 and the grip probe 4. Next, the AC voltage of the AC electric source 7 is made zero (0) V, and thus the vibration of the observation probe 3 by the static electricity is stopped. Additionally, there is made such that the sample S is not moved by the static electricity between the sample S and the observation probe 3 or the grip probe 4 by applying a feedback voltage φ(=−Vs) when measuring the shape of the sample to the bias electric sources 5 and 6.

Next, the observation probe 3 and the grip probe 4 are approached to the substrate Sb side by setting large the amplitude damping rate of the resonance frequency of the observation probe 3.

Next, under this state, an operation gripping the sample is commenced.

Under this state, by the fact that the observation probe 3 and the grip probe 4 contact with the sample becoming an object without contacting with the substrate Sb surface, there is made such that the operation gripping the sample is performed.

Incidentally, in a case where the operation gripping the sample is performed with the observation probe 3 and the grip probe 4 being contacted with the substrate Sb surface, there is made such that the operation of the grip is performed after the observation probe 3 is pushed till it becomes a predetermined deflection quantity while detecting a displacement by the fact that the observation probe 3 deflects, by an optical lever system. As to a method of the grip, a grip actuation can be performed by current-supply-heating a thermal actuator portion (not shown in the drawing) of a hinge part in a root of the grip probe to thereby enlarge a linear expansion of the thermal actuator portion, and rotation-moving the grip probe to the observation probe side.

Next, after completing the fact that the sample is gripped, the observation probe 3 and the grip probe 4 are moved to a predetermined position on a substrate plane by the XYZ scanner 13. There is made such that, at this time, there is kept a state in which the observation probe 3 is separated from the substrate Sb surface by controlling the Z servo system of the XYZ one body type scanner controller 18.

Incidentally, in the present embodiment, although the operation of the movement of the sample is performed without the probe being contacted with the substrate surface, there may be used a contact mode in which the observation probe 3 is contacted with the substrate Sb surface, and the observation probe 3 and the grip probe 4 are moved to the predetermined position on the substrate plane by the XYZ scanner 13 under a state in which there is made such that the displacement of the observation probe 3 becomes constant.

Incidentally, in the present embodiment, although there is explained the example in which the sample is moved to the predetermined position on the substrate, the sample may be moved to a predetermined position provided in the sample base in an outside of the substrate.

Finally, the separation of the sample is explained.

After moving to the predetermined position, in a predetermined position on a substrate face, the observation probe 3 and the grip probe 4 are approached to the substrate Sb by the XYZ scanner 13. At this time, they are contacted till becoming a predetermined value while detecting a displacement (deflection) quantity of the observation probe 3 by using the optical lever system.

Next, the observation probe 3 and the grip probe 4 are pulled up by about 10-1000 nm from the substrate Sb surface by the XYZ scanner 13. A tweezers is opened in order to release the grip of the sample. After opening the tweezers, additionally the voltage of −V volt (the substrate is a minus electric potential) is applied to the observation probe 3 and the grip probe 4 by the bias electric sources 5 and 6, and the sample is separated by being attracted to the substrate side by the static electricity, thereby completing an operation moving the sample to a predetermined position.

Incidentally, in the present embodiment, as the voltage when separating the sample from the probe, although the DC voltage is applied, the voltage may be applied like a pulse.

Incidentally, in the present embodiment, although there is explained about a structure of the tweezers comprising the observation probe and the grip probe, there may be a multi-probe comprising the observation probe and plural grip probes or working probes.

What is claimed is:

1. A sample operation apparatus operating a sample by an electrically conductive observation probe having in its tip, and an electrically conductive grip probe provided while adjoining the observation probe with a predetermined distance, which comprises:
    a bias electric source applying a DC voltage to the observation probe,
    an AC electric source applying an AC voltage to the observation probe,
    a displacement detection means detecting a displacement of the observation probe,
    a sample base fixing the sample or a substrate,
    a scan means relatively moving the sample base and the observation probe or the grip probe in a direction parallel to a surface of the sample base, and
    a second scan means relatively moving the sample base and the observation probe or the grip probe in a direction perpendicular to the surface of the sample base.

2. A sample operation apparatus according to claim 1, wherein in a shape measurement of the sample or the substrate, the bias electric source detects a vibration of the observation probe by the AC electric source by the displacement detection means, and applies such a DC voltage that the vibration becomes small.

3. A sample operation apparatus according to claim 2, wherein there are possessed:
    a second bias electric source applying a DC voltage to the grip probe, and
    a delay circuit finding a timing at which the second bias electric source applies it to the grip probe.

4. A sample operation apparatus according to claim 3, wherein the second bias electric source applies the voltage that the bias electric source applied, at the timing found by the delay circuit while scanning the observation probe and the grip probe parallel to the surface of the sample base by the scan means.

5. A sample operation apparatus according to claim 1, wherein when gripping the sample, the voltage is applied to the bias electric source such that an electric potential of the sample and electric potentials of an observing probe and a gripping probe become equal.

6. A sample operation apparatus according to claim 1, wherein the observation probe and the grip probe are electrically insulated.

* * * * *

UNITED STATES PATENT AND TRADEMARK OFFICE
CERTIFICATE OF CORRECTION

PATENT NO. : 7,770,474 B2
APPLICATION NO. : 11/928303
DATED : August 10, 2010
INVENTOR(S) : Masatoshi Yasutake et al.

Page 1 of 1

It is certified that error appears in the above-identified patent and that said Letters Patent is hereby corrected as shown below:

On the Title Page

In the left column, insert a new item as follows.

--Foreign Application Priority Data

Oct. 31, 2006     (JP)     2006-295212--.

Signed and Sealed this
Fifth Day of April, 2011

David J. Kappos
*Director of the United States Patent and Trademark Office*